United States Patent [19]

Carlson

[11] 4,204,927

[45] May 27, 1980

[54] CROSSLINKING OF ESTERIFIED FLUOROCARBON POLYMER

[75] Inventor: Dana P. Carlson, Parkersburg, W. Va.

[73] Assignee: E. I. Du Pont de Nemours and Company, Wilmington, Del.

[21] Appl. No.: 871,116

[22] Filed: Jan. 20, 1978

Related U.S. Application Data

[62] Division of Ser. No. 680,874, Apr. 27, 1976, abandoned.

[51] Int. Cl.$^2$ ............................ C08J 3/28; C08J 7/10; C08F 8/14
[52] U.S. Cl. ........................... 204/159.18; 204/159.14; 204/159.2; 525/359; 525/386; 526/245

[58] Field of Search ................... 204/159.18; 526/245, 526/46, 56

[56] References Cited

U.S. PATENT DOCUMENTS

| | | | |
|---|---|---|---|
| 2,484,529 | 10/1949 | Roedel | 204/159.2 |
| 3,322,721 | 5/1967 | Howard, Jr. | 260/46.5 |
| 3,444,148 | 5/1969 | Adelman | 526/242 |
| 3,548,408 | 12/1970 | Worrall | 526/56 |
| 3,698,856 | 10/1972 | Pittman | 8/115.5 |

Primary Examiner—C. A. Henderson

[57] ABSTRACT

Process for crosslinking fluorocarbon polymers, of ethylene and tetrafluoroethylene or chlorotrifluoroethylene, which contain esterified pendant polyfluorinated tertiary alcohol groups.

2 Claims, No Drawings

CROSSLINKING OF ESTERIFIED FLUOROCARBON POLYMER

CROSS-REFERENCE TO RELATED APPLICATIONS

This application is a divisional of application Ser. No. 680,874, filed Apr. 27, 1976, now abandoned.

FIELD OF THE INVENTION

This invention relates to the crosslinking of polymers having esterified hydroxyl groups.

BACKGROUND

The pendant polyfluorinated tertiary alcohol groups on fluorocarbon polymers have generally heretofore been known. Some such fluorocarbon polymers are described, e.g., in U.S. Pat. No. 3,342,777 (to Howard), British Pat. No. 1,001,352 and U.S. Pat. No. 3,444,143 (to Adelman). By esterifying these polymers, a variety of useful products can be obtained.

SUMMARY OF THE INVENTION

A process for crosslinking an esterified polymer of
(a) 40–60 mole percent ethylene,
(b) 60–40 mole percent tetrafluoroethylene or chlorotrifluoroethylene, said mole percents being based on (a) and (b) monomers present, and
(c) 0.1 to 30 weight percent, based on weight of (a), (b) and (c) monomers present, of the esterification reaction product of

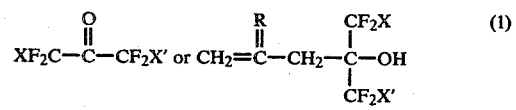   (1)

wherein X and X' are each independently H, F, Cl, Br, perfluoroalkyl of 1–3 carbon atoms, or ω-hydrofluoroalkyl of 1–3 carbon atoms, and X and X' taken together form a divalent perfluoroalkylene of 1–3 carbon atoms, and R is hydrogen or methyl, with
(2) an acid halide or anhydride selected from $$R'''-\overset{O}{\underset{\|}{C}}Y \text{ or } R'\overset{O}{\underset{\|}{C}}-O-\overset{O}{\underset{\|}{C}}R''$$

wherein Y is Cl, Br or F; and R'' and R' each independently is aryl of 6–10 carbon atoms, which comprises subjecting said esterified polymer to ultraviolet radiation.

DESCRIPTION OF THE INVENTION

Polymers employed in this invention can be prepared by the procedures described in U.S. Pat. No. 3,342,777 or U.S. Pat. No. 3,444,148 and include the terpolymers of ethylene, tetrafluoroethylene or chlorotrifluoroethylene and a third comonomer which is a fluorinated ketone (which provides hydroxyl-containing side chains) of the formula

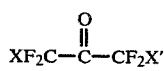

wherein X and X' are defined as above, or

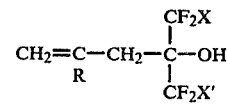

where X, X' and R are defined as above. These polymers are esterified with an acid halide or anhydride of the formula

Some examples of acid halides and anhydrides which form esters with the polyfluorinated tertiary alcohol side groups are listed as follows: benzoyl chloride, m-bromobenzoyl chloride, p-chloro-benzoyl chloride, phthalic anhydride, trimellitic anhydride monoacid chloride, 3,4-dichlorobenzoyl chloride and m-(chlorosulfonyl)-benzoyl chloride.

The conditions for carrying out the esterification reaction will vary depending on the reactants employed. However, temperatures in excess of 100° C. should be employed, and temperatures in the range of 150°–200° C. are preferred. Temperatures above 200° C., e.g., up to 300° C., may be used in certain cases, however, swelling or dissolving of the polymer may result at higher reaction temperatures. This may be desirable in some cases but, generally, the polymer is more easily handled if it is not dissolved by the reagent.

The polymer may be reacted in the form of either a finely divided powder or a film, tubing, wire coating or other molded or extruded shape. The physical form of the polymer is not important to the course of the esterification reaction. The choice of physical form will be determined by several factors. Among these are convenience, cost, purpose of treatment (crosslinking, etc.) completeness of reaction needed, depth of penetration needed or desired. It is particularly desirable to carry out the subsequent chemical crosslinking reaction of this invention with the polymer in its fabricated form. In these cases, the final result of the treatment is to make the polymer intractable and, thus, difficult, if not impossible, to fabricate further.

The polymer may be reacted with the acid halide or anhydride, either neat or in a solvent. The reaction can be carried out with the reagent either in the liquid or vapor phase.

In most cases, the reaction can be carried out conveniently at atmospheric pressure. However, in some instances it may be desirable to use lower or higher pressures.

It is preferred, but not necessary, that the reaction take place in an inert atmosphere, e.g., $N_2$.

Generally, the time of contact between the polymer and the acid halide or anhydride will be between 4 and 40 hours. Preferred contact time will depend on temperature as well as on the reactivity of the starting materials.

Representative solvents, when used, include the aromatic ketones and ethers, e.g., acetophenone and anisole.

The esterified polymer is subjected to crosslinking to reduce creep, increase modulus and elastic memory, or improve solder iron resistance and mechanical properties at high temperatures.

Thus

in which R', R" and R'" are aryl groups of 6–10 carbon atoms is employed to esterify the polymer, and the esterified polymer can be fabricated and then crosslinked by subjecting it to ultraviolet irradiation.

The Example which follows illustrates the crosslinking process of the invention.

EXAMPLE 1

A 300 ml flask was charged with a mixture of 100 ml of benzoyl chloride and 50 g of a finely divided copolymer of tetrafluoroethylene and ethylene (ca 1:1 mole ratio) which also contained about 1.3 wt % side groups of the monovalent radical of hexafluoroisopropanol

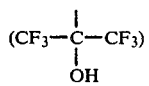

(The concentration of this group was determined by a measurement of the absorbance of its characteristic band at 3600 cm$^{-1}$ in the infrared spectrum of the copolymer). The polymer was prepared as generally described herein.

The mixture of copolymer and benzoyl chloride was heated to reflux the benzoyl chloride ($\sim$170° C). HCl was observed to be evolved from the refluxing mixture. The refluxing was continued for a period of 4-½ hours after which time the mixture was cooled and filtered. The polymer was then washed three times with 500 ml portions of acetone by stirring vigorously in a blender and then filtering on a suction filter. Then the polymer fluff was dried in an air oven at 125° C.

A 0.0127 cm thick compression molded film of the dried product was prepared by pressing at 300° C. and quenching in cold water. An infrared scan of the product film showed the complete absence of absorbance at 3600 cm$^{-1}$ and a new strong absorbance band at 1755 cm$^{-1}$. There was also a weaker absorption band at 1595 cm$^{-1}$. This indicated the complete reaction of the alcohol groups on the polymer to benzoate ester groups.

A sample of the benzoate ester polymer was pressed into a film 10.2 cm × 10.2 cm × .025 cm by compression molding at 300° C. A similar film was prepared from the unreacted polymer used in this Example. The films of the control and benzoate ester polymers were placed in the center of an ultraviolet light (UV) "Rayonet" photochemical reactor. The reactor was about 20.4 cm in diameter and had 16 lamps positioned equidistant around the circumference. The lamps were the type RUL 2537A° (total output at 2537A° was 240 watts). The temperature in the reactor was about 50° C. during the exposure. The films were exposed for a total of 21-½ hours. When they were removed, the benzoate film had a slight yellowish cast and the control film was unchanged in appearance.

In order to demonstrate that UV exposure caused crosslinking of the benzoate ester film (but not the control film), the following test was devised. Small squares (about 2.5 cm on a side) of UV treated control and benzoate ester films were placed on aluminum foil. Also, a similar piece of film which had been crosslinked by 7.5 Mrad dose of electron irradiation was placed on the foil beside the other two films. Another piece of aluminum foil was placed on top and the "sandwich" was placed in a press in which the platens were held at 300° C. The films were heated without pressure for 1 minute and then under about 35kg/cm$^2$ pressure for ½ minute. The "sandwich" was then removed and quenched in cold water. The films were all expanded to about twice their original dimensions by this pressing procedure. Each film was peeled off the foil and placed on a new foil and heated again in the press at 300° C. without pressure for 1 minute. This reheating caused both the UV exposed benzoate ester film and the electron irradiated film to shrink back to near their original shape. However, the reheating caused no change in the UV irradiated control film. It melted down but did not shrink back. This test indicated that UV exposure of the benzoate ester film caused it to be crosslinked similar to that achieved by electron irradiation.

The high termal stability of the benzoate ester polymer was shown by the following test. Samples of the benzoate ester polymer were preheated in a press at 300° C. for periods of 8 and 17 minutes prior to pressing into film. Neither exposure caused any decomposition of the benzoate ester groups.

The embodiment of the invention in which an exclusive property or privilege is claimed are as follows:

1. Process for crosslinking an esterified polymer of
   (a) 40–60 mole percent ethylene,
   (b) 60–40 mole percent tetrafluoroethylene or chlorotrifluoroethylene, said mole percents being based on (a) and (b) monomers present, and
   (c) 0.1 to 30 weight percent, based on weight of (a) (b), and (c) monomers present, of the esterification reaction product of

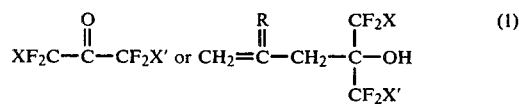

wherein X and X' are each independently H, F, Cl, Br, perfluoroalkyl of 1–3 carbon atoms, or ω-hydrofluoroalkyl of 1–3 carbon atoms, and X and X' taken together form a divalent perfluoroalkylene of 1–3 carbon atoms, and R is hydrogen or methyl, with
   (2) an acid halide or anhydride selected from

wherein Y is Cl, Br or F; and R', R" or R'" each independently is aryl of 6–10 carbon atoms, which comprises subjecting said esterified polymer in the absence of other materials to ultraviolet radiation.

2. Process of claim 1 wherein the acid derivative is benzoyl chloride.

* * * * *